United States Patent [19]
Mann

[11] Patent Number: 6,023,561
[45] Date of Patent: *Feb. 8, 2000

[54] SYSTEM FOR PROCESSING TRACEABLE CACHE TRACE INFORMATION

[75] Inventor: Daniel P. Mann, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/456,884

[22] Filed: Jun. 1, 1995

[51] Int. Cl.$^7$ ........................................... G06F 11/00
[52] U.S. Cl. ........................................... 395/183.21
[58] Field of Search ................. 395/183.01, 183.04, 395/183.21, 500, 183.05; 364/261.3, 261.6, 262.4, 263.2

[56] References Cited

U.S. PATENT DOCUMENTS

| | | | |
|---|---|---|---|
| 4,694,420 | 9/1987 | Petter et al. | 364/900 |
| 5,321,828 | 6/1994 | Phillips et al. | 395/500 |
| 5,357,626 | 10/1994 | Johnson et al. | 395/500 |
| 5,446,876 | 8/1995 | Levine et al. | 395/184.01 |
| 5,491,793 | 2/1996 | Somasundaram et al. | 395/183.21 |

FOREIGN PATENT DOCUMENTS 0 530 816 A3  3/1992  European Pat. Off. .

OTHER PUBLICATIONS

Advanced Micro Devices, Inc., Am29040 Microprocessor User's Manual 29K Family, 1994, Chapter 12 pp. 12/1–12/26.

James R. Larus, Efficient Program Tracing, May 26, 1993, pp. 52–61, University of Wisconsin–Madison, 8153 Computer No. 5 Los Alamitos, CA, US.

N. N. Bezrukov, Neuristic Methods of Improving Disassembly Quality, Dec. 17, 1986, pp. 195–203, Translated from Programmirovanie, No.4 , 1989 Plenum Publishing Corporation.

Source Level Debugging Using A Window Interface, Advanced Micro Devices, Programming the 29K™ RISC Family, Second Edition, ©1995, Chapter 7.7, pp. 376–382.

*Primary Examiner*—Albert DeCady
*Attorney, Agent, or Firm*—Skjerven, Morrill, Macpherson, Franklin, & Friel, L.L.P.; Stephen A. Terrile

[57] ABSTRACT

A trace analysis system for tracing the operation of a processor. The trace analysis system includes a process data module and a process instructions module. The process data module processes data accesses of selected test data. The process instruction module processes instruction execution of the selected test data based upon the detection of a non-sequential instruction having a target address. The process instructions module uses the target address of the non-sequential instruction to determine an instruction sequence.

24 Claims, 14 Drawing Sheets

FIG. 2A-3

SYSTEM FOR PROCESSING TRACEABLE CACHE TRACE INFORMATION

BACKGROUND OF THE INVENTION

The present invention relates to microprocessors, and more particularly to processing traceable cache trace information provided by microprocessors.

It is known to provide a microprocessor with a traceable cache feature. For example the processor available under the trade designation Am29040, available from Advanced Micro Devices, located in Sunnyvale, Calif., provides a traceable cache feature. The traceable cache feature permits a hardware development system to trace the execution of the processor while the processor is executing out of a cache.

Cache tracing is accomplished using two processors in tandem; a main processor and a tracing processor. The main processor performs all the required operations and the tracing processor duplicates the operation of the main processor except that the tracing processor uses particular outputs, referred to as slave or tracing outputs, to indicate the instruction trace. The slave outputs include the address lines of the tracing processor, as well as the REQ#, the R/W# and I/D# lines of the tracing processor. The tracing processor is coupled in parallel with the main processor; however, all of the tracing processor's outputs are disabled. This arrangement is similar to a master/slave relationship with the exception that the tracing processor slave outputs are not connected to the main processor. Because the tracing processor uses the slave outputs to indicate the instruction trace, the tracing processor relies on the main processor to perform all accesses for the tracing processor. The tracing processor latches the results of accesses by the main processor. All processor outputs to the system are driven by the main processor. The address bus of the tracing processor, along with the signal REQ#, R/W#, and I/D# indicate the processor's internal access to the instruction and data caches.

Because the main processor may make more than one cache access per cycle, (one instruction cache access and one data cache access), the tracing processor does not reflect all instruction accesses, but only those accesses associated with branch targets. Because branches, loads and stores are caused by separate instructions, the processor cannot execute more than one branch target or data access per cycle. Accordingly, a hardware development system can reconstruct the instruction execution sequence from the sequence of branch target addresses.

When the main processor takes a branch whose target address hits in the cache, the physical address of the branch target instruction appears on the address bus of the tracing cache. If the main processor takes a branch, the tracing processor reflects the branch target.

When a load or stores hits in the data cache, the tracing processor drives the corresponding physical address on the address bus. The store address is reflected as the store is placed into the write buffer, maintaining proper ordering with loads. The store data is not reflected. Once the store has been placed into the write buffer, the tracing processor does not perform any other actions related to the store, except to write the data into the cache if the corresponding block is in the cache. All other required actions, such as write through, are taken by the main processor, and thus appear on the bus of the main processor.

It is also known to provide a processor with status output signals which indicate information about processor modes along with other information about processor operation. For example, the status output signals may indicate when the processor is in a halt mode, when the processor is in a pipeline hold mode, when a processor is in a load test instruction mode, when a processor is in a wait mode, when an interrupt return in generated, when a processor is processing an interrupt or a trap, when a processor is processing a non-sequential instruction fetch, or when a processor is in an executing mode.

SUMMARY OF THE INVENTION

The present invention relates to a system for applying traceable cache information. The system accesses trace data and reconstructs an execution path and data accesses performed by the traced program.

More specifically, in a preferred embodiment, the invention relates to a method for tracing the operation of a processor to provide a trace output corresponding to cycles of operation of the processor. The method includes capturing a trace of the operation of the processor, providing the trace as selected test data, processing data accesses of the selected test data, and processing instructions of the selected test data based upon the detection of a non-sequential instruction having a target address. The processing instructions step uses the target address of the non-sequential instruction to determine an instruction flow.

In an alternate embodiment, the invention relates to a method for producing an assembly code representation of operation of a processor. The method includes the steps of capturing a trace of the operation of the processor, providing the trace as selected test data, and producing an assembly code representation of the selected test data based upon the selected test data. The producing assembly code step includes the steps of processing data accesses of the selected test data, and processing instructions of the selected test data based upon the detection of a non-sequential instruction having a target address. The processing instructions step uses the target address of the non-sequential instruction to determine an instruction flow.

Additionally, in an alternate embodiment, the invention relates to a trace analysis apparatus for tracing the operation of selected test data of a processor. The apparatus includes a process data module and a processing instructions module. The process data module processes data accesses of the selected test data. The process instruction module processes instruction execution of the selected test data based upon the detection of a non-sequential instruction having a target address. The process instructions module uses the target address of the non-sequential instruction to determine an instruction corresponding to the target address.

BRIEF DESCRIPTION OF THE DRAWINGS

FIG. 2A-1, FIG. 2A-2, FIG. 2A-3, FIG. 2B, and FIG. 2C show screen presentations of the screen of the trace analysis system of FIG. 1.

FIG. 3 shows a flow chart of the operation of the trace analysis system of FIG. 1.

DETAILED DESCRIPTION

The following sets forth a detailed description of the best contemplated mode for carrying out the invention. The description is intended to be illustrative of the invention and should not be taken to be limiting.

Figure 1:
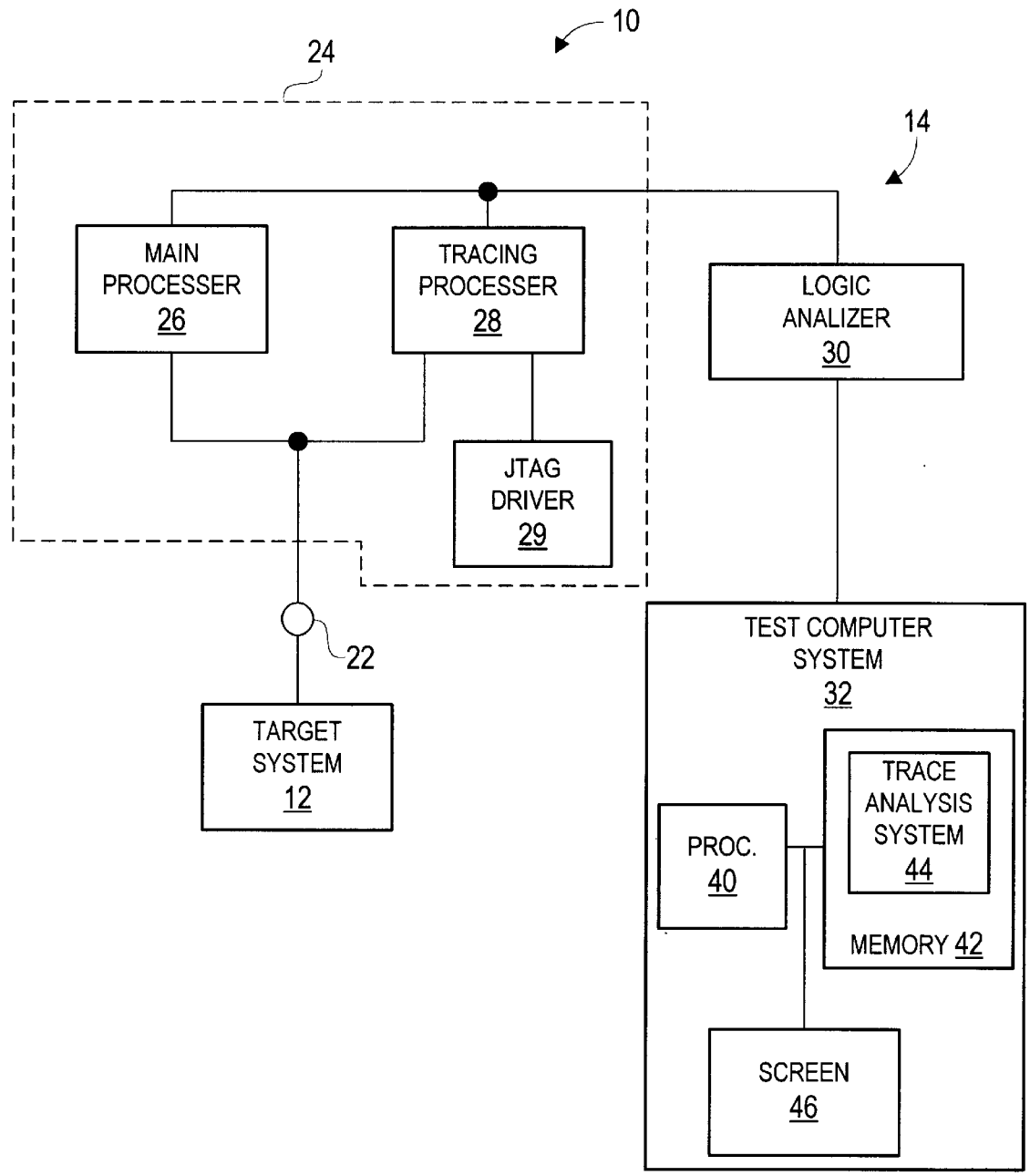
FIG. 1 shows a block diagram of a computer system which includes a trace analysis system.

FIG. 1 shows system 10 having target system 12 as well as test system 14. Target system 12 includes connection terminal 22 to which a processor may be coupled. Target system 12 also includes test portion 24 having main processor 26 and tracing processor 28 coupled in parallel to connection terminal 22. Test portion 24 is coupled to correspond to the pin connections of connection terminal 22 as if a processor were coupled to connection terminal 22. I.e., the connection of test portion 24 to connection terminal 22 is pin compatible with the pins of processor 26. Test portion 24 also includes Joint Test Action Group (JTAG) driver circuit 29 which cause tracing processor 28 to function in a slave mode of operation. Main processor 26 and tracing processor 28 of test portion 24 is also coupled to test system 14.

More specifically, all of the signal paths provided by main processor 26 are coupled to test system 14. Additionally, the address signal path (S ADDR), as well as the tracing processor's request (S REQ#), the tracing processor's read/write (S R/W#) and the tracing processor's instruction or data access (S I/D#) signal paths are separately coupled to test system 14.

Test system 14 includes logic analyzer 30 as well as test computer system 32. Test computer system 32 includes processor 40 coupled to memory 42. Memory 42 includes trace analysis system 44, which is executed by processor 40. Test computer system 32 may also include screen 46 via which results of tests are displayed.

FIG. 2A-1, FIG. 2A-2, and FIG. 2A-3 show a screen presentation which is generated by processor 40 and presented on screen 46 of test computer system 32. More specifically, screen presentation 50 includes original trace data window 52, assembly language window 54 and source code window 56. Original trace data window 52 includes columns which correspond to the various connections between logic analyzer 30 and test portion 24. More specifically, original trace data window 52 includes a line number column (Label), an address column (ADDR), a data column (DATA), a status column (*STAT_), a ready signal column (_RDY), a slave instruction/data cache hit signal column (S I/D#), a burst column (BURST) and a slave address column (S ADDR). Assembly language window 54 includes columns which correspond to a line number, a symbolic equivalent of address indication (SYMADDR), disassembled data indication (ASMDATA), a read/write indication (R/W#) and a status indication (*STAT). Source code window 56 includes a line number column and a code portion.

Figures 1, 2A:
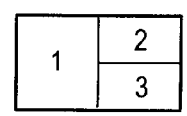
Figures 2, 2A:
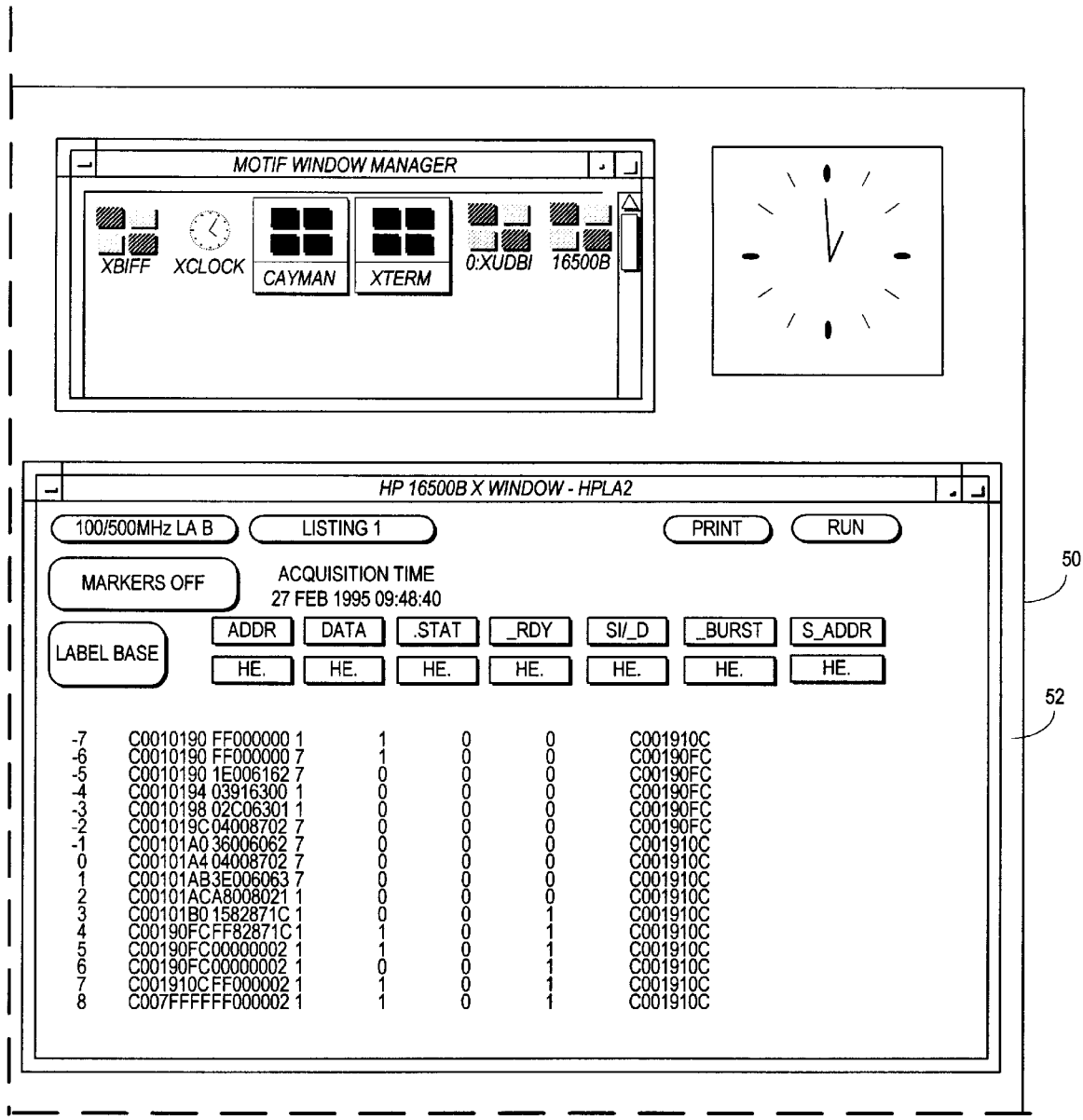
Figure 2B:
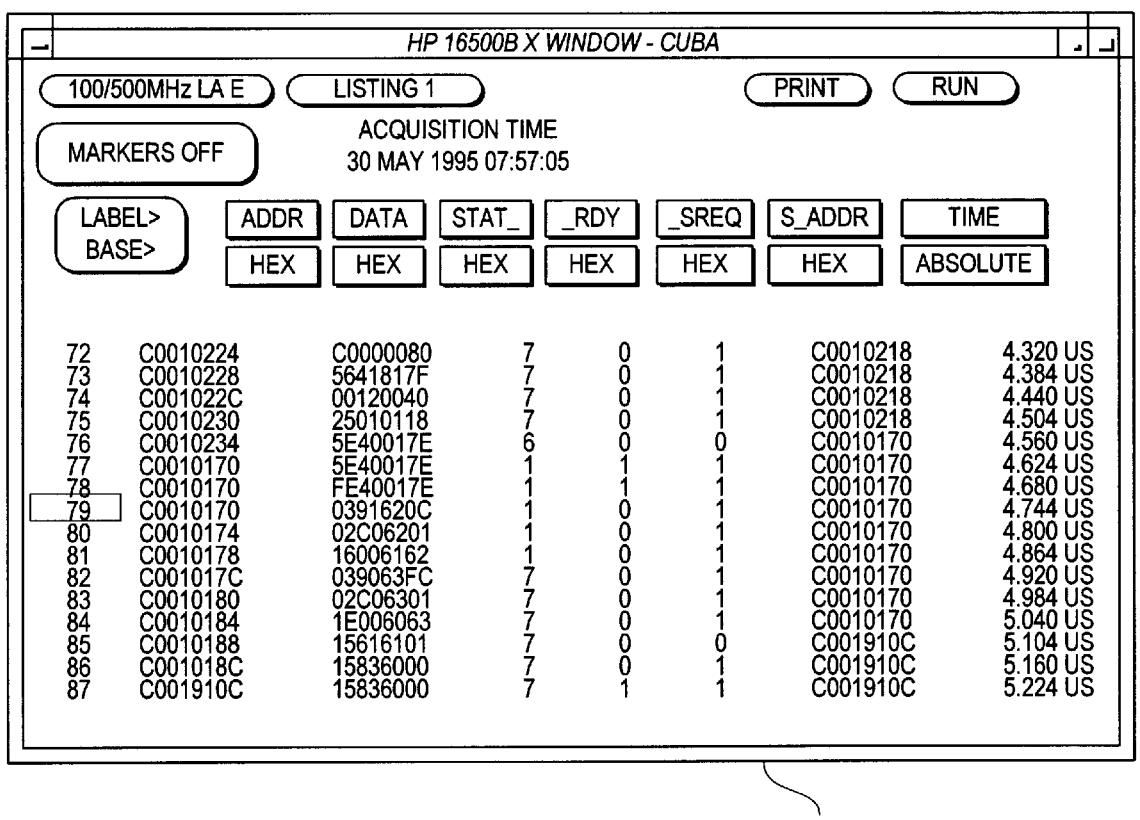
Figure 2C:
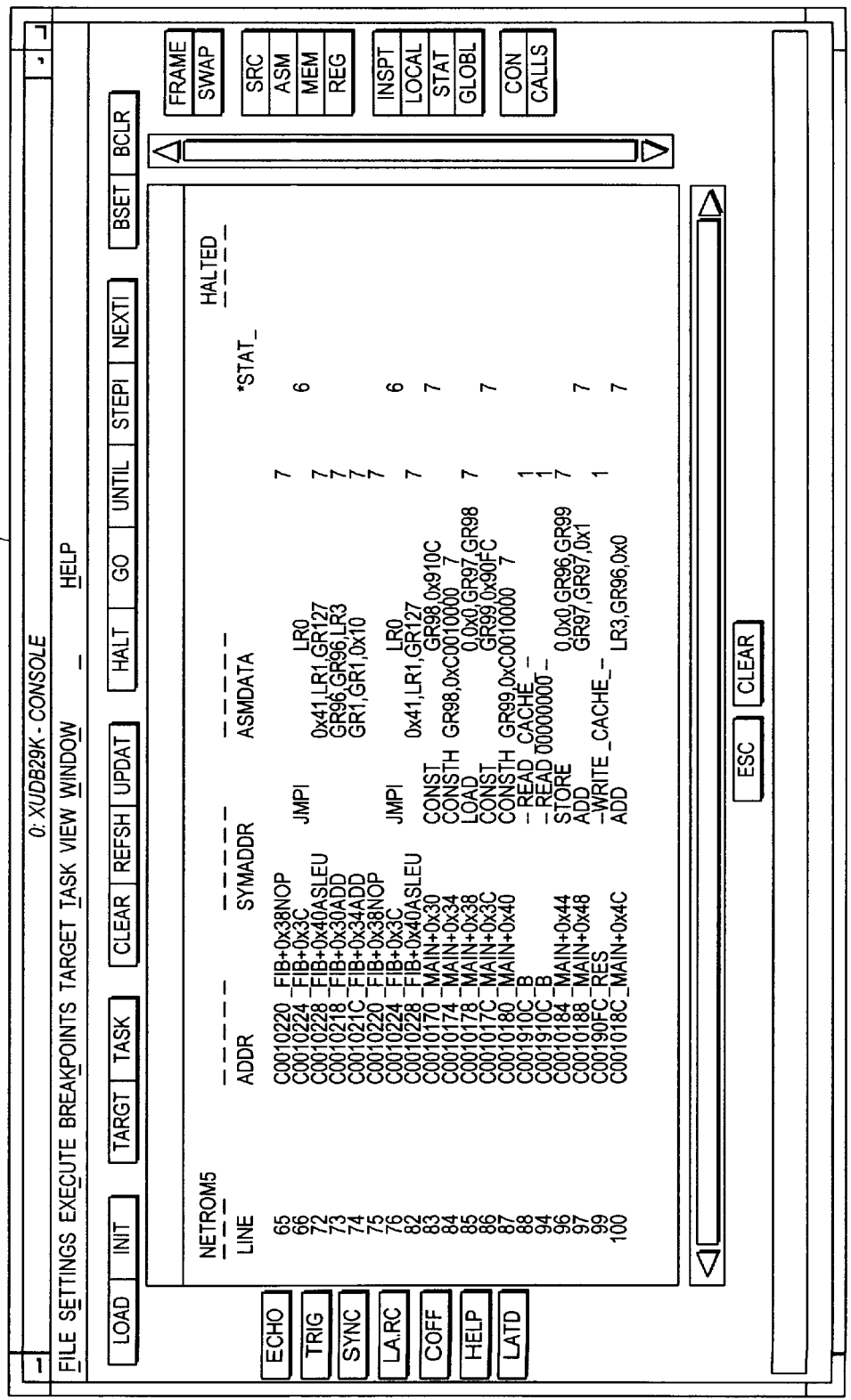

FIGS. 2B and 2C show other examples of original trace window 52 and assembly language window 54.

Figure 3:
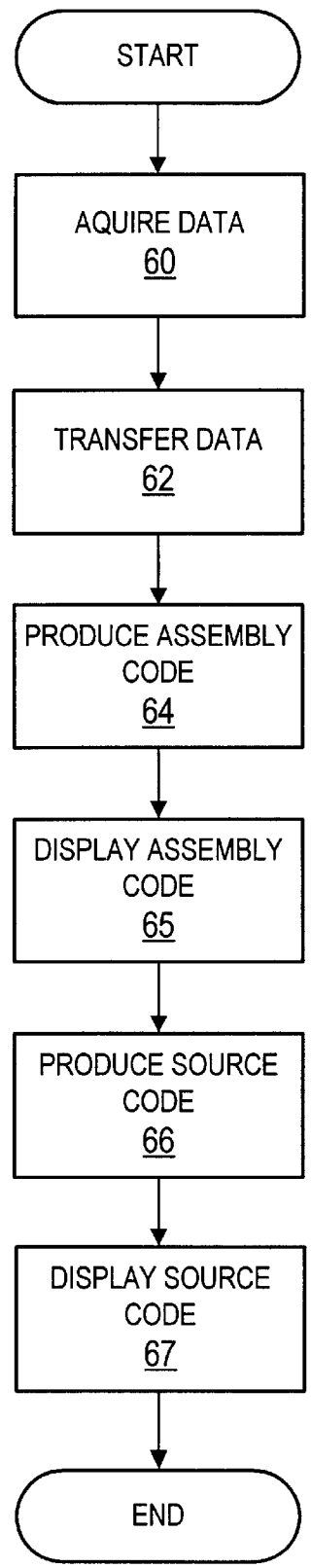

FIG. 3 is a flow chart of the operation of test system 14. When a trace analysis is initiated, logic analyzer 30 is configured to acquire test data from test portion 24 at acquire data step 60. I.e., logic analyzer 30 captures a trace of the operation of main processor 26. This test data includes data for each clock cycle of test portion 24. The test data includes the address signal (ADDR), the read/write signal (R/W#), the ready signal (RDY#), the instruction or data access signal (I/D#) signal and the status signal (STAT) from main processor 26. The test data also includes the slave address signal (S ADDR), slave burst signal (S BURST), the slave request signal (S REQ#), the slave read/write signal (S R/W#) and the slave instruction or data access signal (S I/D#).

Next, control transfers to transfer data step 62, during which a portion of the data which was acquired from logic analyzer 30 (i.e., a portion of the captured trace) is selectively transferred from logic analyzer 30 to memory 42 of test system computer 32. The portion of data which is selectively transferred begins with a branch instruction and then continues so that the portion of trace data of interest, i.e., the portion which is being debugged, is included within the selected test data. This transfer places the transferred data into a more efficiently accessible form. The data may be more efficiently accessed because it is located in the memory 42 of test computer system 32, and is thus more readily accessible by processor 40 of test computer system 32. Additionally, this selected test data is significantly smaller, i.e., includes fewer lines, than the actual captured test sample; thus, processor 40 need not access as many lines when executing trace analysis system 44.

Control then transfers to produce assembly code step 64, during which step, assembly code which corresponds to the data which was acquired from logic analyzer 30 and stored in memory 44 is produced. The assembly code is produced by processor 40 executing trace analysis system 44 and accessing the selected test data which was acquired from logic analyzer 30 and stored in memory 44 The assembly code is then presented, during display assembly code step 65, in assembly code window 54 in a format that allows for trouble-shooting of the operation of main processor 26.

After the assembly code is produced, the corresponding source code is produced at produce source code step 66. More specifically, trace analysis system 44 uses a common object file format (COFF) file which corresponds to selected test data to produce source code which corresponds to the produced assembly code. The source code is then presented, during display source code step 67, in source code window 56 in a format that allows for trouble-shooting of the operation of main processor 26. In this window, a line of code is highlighted which corresponds to the current trace position.

After all of the test code has been processed, trace analysis system finishes operation.

Figure 4:
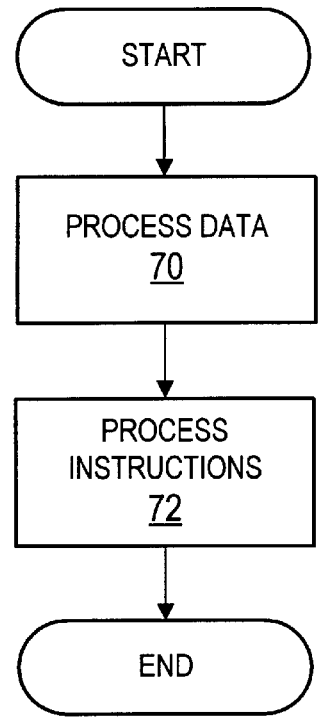
FIG. 4 shows a flow chart of the produce corresponding instruction step of the flow chart of FIG. 3.

FIG. 4 is a block diagram of the operation of produce assembly code step 64 of trace analysis system 44. Produce assembly code step 64 includes process data module 70 and process instruction module 72. Processing of the selected test data proceeds sequentially through the selected test data first for the process data module and then for the process instruction module. After processing all of the selected test data, produce assembly code step 64 completes.

During operation of process data module 70, data accesses are examined to determine whether there are any repeat accesses reported due to the use of scaleable clocking. In scaleable clocking, the internal processor clocking speed is faster than the external memory access clocking speed and thus reported accesses are duplicated. Accordingly, because trace information is captured at the internal processor clocking speed, accesses to memory are captured multiple times in adjacent trace cycles. Only the final captured trace is considered valid.

Data transfer, due to a load or store instruction, can occur during the same cycle another instruction is executed. When this happens, the trace analysis system 44 moves the reporting of the data access to a future trace cycle which contains no valid trace information. If another data transfer occurs before the previous is reported, then the previous data value is not reported. The R/W#, and I/D# information is repositioned where necessary and possible, so as to report data accesses which occurred. However, burst data accesses such as the load multiple (LOADM) and store multiple (STOREM) data accesses are reported before instruction execution is reported.

By using data provided by tracing processor 28, data accesses which generate a cache hit are reported in the same way as external, memory resident, data accesses. When a data transfer occurs, it is reported in the next available cycle (which may be the current cycle) which is not being used to report an instruction's execution or other valid data access. When the data cache is turned on, it is not always be possible to report the value of the data transferred. Tracing processor 28 does not provide the cached data value, only the address. For vector fetches, the vector fetch and the address of the first instruction as well as the status of the vector fetch are reported on the current cycle.

After the data is processed, control transfers to process instruction module 72. Process instruction module 72 produces a complete address-flow for executed code. Process instruction module 72 includes a recursive address generation module which determines consecutive instruction execution sequences based upon the presence of non-sequential, e.g., branch, instructions.

Figure 5:
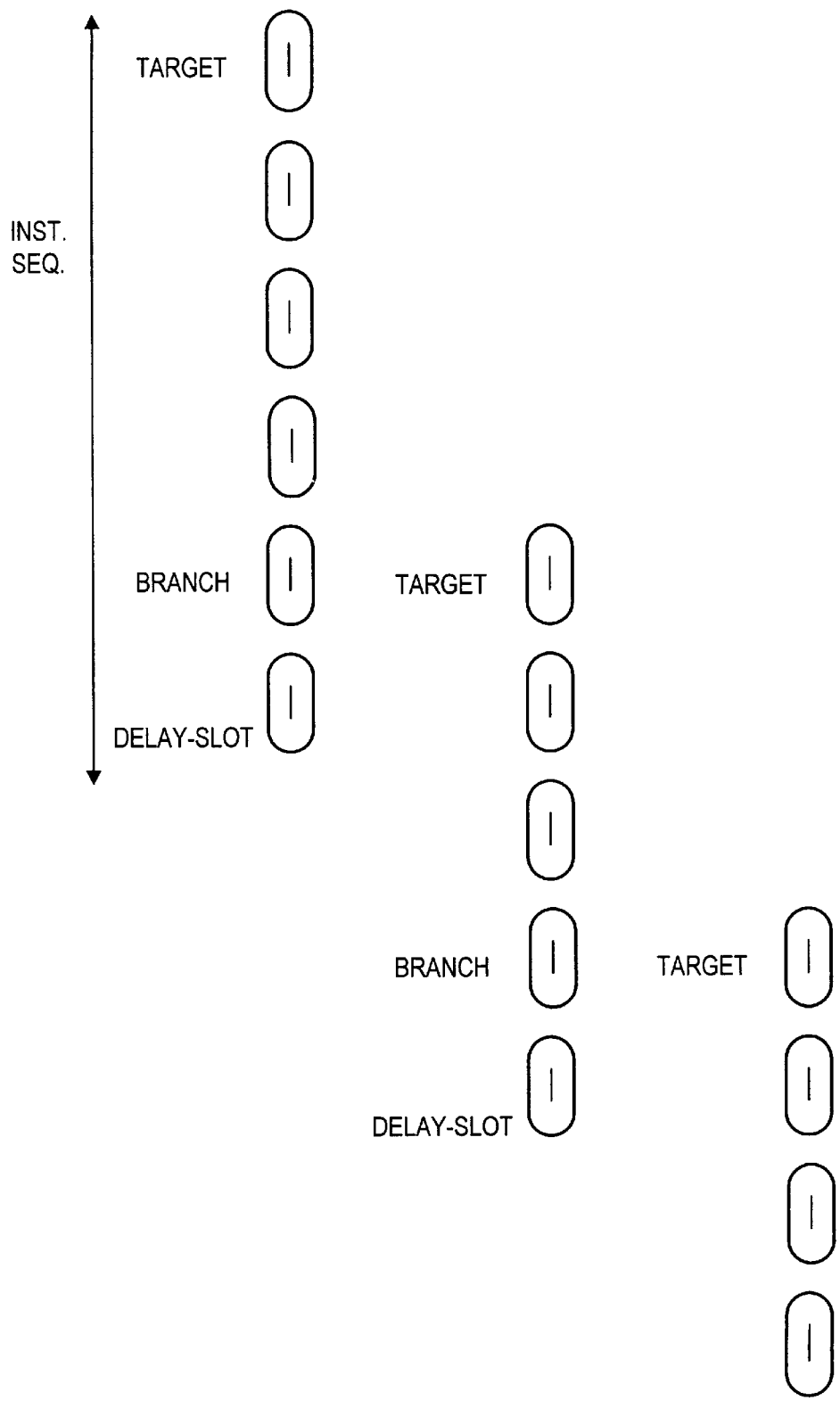
FIG. 5 is a diagrammatic block diagram of an exemplative instruction processing sequence.

For example, FIG. 5 shows an example of the operation of process instruction module 72. The address generation module starts with a branch instruction and stops when it reaches a delay-slot instruction. Branch instructions initiate new instruction sequences for process instruction module 72 to recursively process. Because test computer system 32 can easily detect the address which corresponds to the branch target, branch instructions provide a desirable starting point for reconstructing the execution path of a traced program.

Once the address flow is determined, an instruction calculation module, which is also recursive, determines the instructions which correspond to the address flow. Often these instructions are fetched from memory and can be found in the data field of a previous trace cycle. However, if the instruction is supplied by the instruction cache, then a value of XXXXXXXX is entered into the data field during transfer data step 62. If an address value lies in the a text region of the traced program, i.e., the region that includes executable code, and the data value DATA which was generated during transfer data step 62 is marked XXXXXXXX, then the source code which corresponds to the instruction is obtained from the COFF file which corresponds to the trace program. This source code is placed in the data field during produce source code step 66 (FIG. 3).

Figure 6:
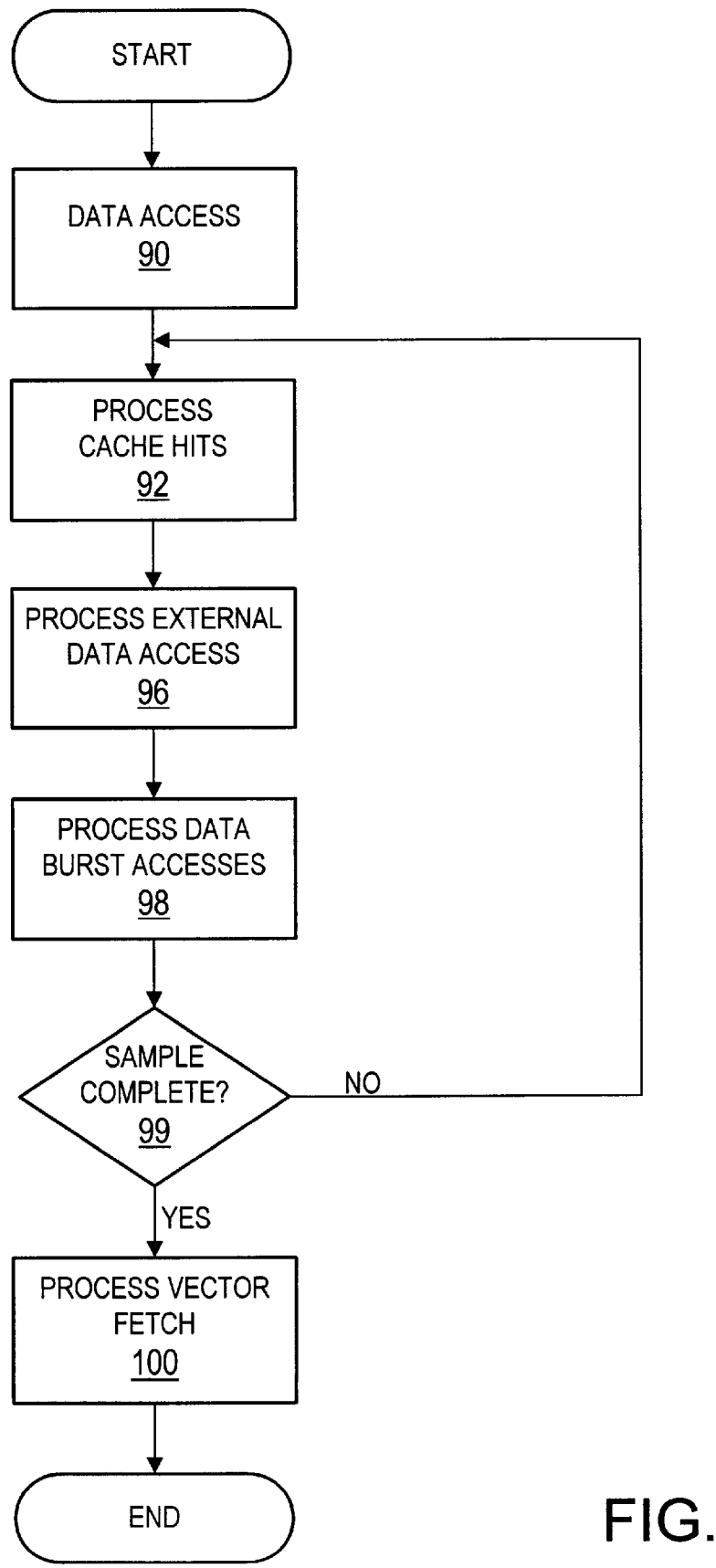
FIG. 6 shows a flow chart of the process data module of the flow chart of FIG. 4.

FIG. 6 is a block diagram of the operation of process data module 70. Process data module 70 starts by finding data accesses at data access step 90. During data access step 90, data repeats, as might be generated because of an internal clock being faster than an external clock, are removed. These data repeats are detected by finding addresses which repeat. Control then transfers to cache hits step 92 where a selected line of the selected test data is processed to detect a data cache hit. During cache hits step 92, the line of the selected test data is processed and a data cache hit, if detected, is reported. After a selected line of the selected test data is processed for data cache hits, control transfers to process external data access step 96. During process external data accesses step 96, the line of the selected test data is processed to determine whether an external data accesses occurred. If an external data access is detected, then this access is reported. After a selected line of the selected test data is processed for an external data access, control transfers to process data burst accesses step 98. During process data burst accesses step 98, the line of the selected test data is processed to determine whether a data burst access occurred. If a burst accesses occurred, then this access is reported. Processing then continues by determining whether the entire selected test data sample has been processed for data cache hits, external data accesses and data burst accesses at sample complete step 99. If processing of the sample is not complete, then control transfers to process data cache hits step 92 to process the next line of the selected test data for data cache hits, external data accesses and data burst accesses. After processing of the sample for data cache hits, external data accesses and data burst accesses is complete, control transfers to process vector fetch step 100. During process vector fetch step 100, all lines of accessed data are processed to determine whether any vector fetches occurred. If any vector fetches occurred, then these vector fetches are reported. After all vector fetches have been processed, then the operation of process data module 70 is complete and control transfers to process instructions module 72.

Figure 7:
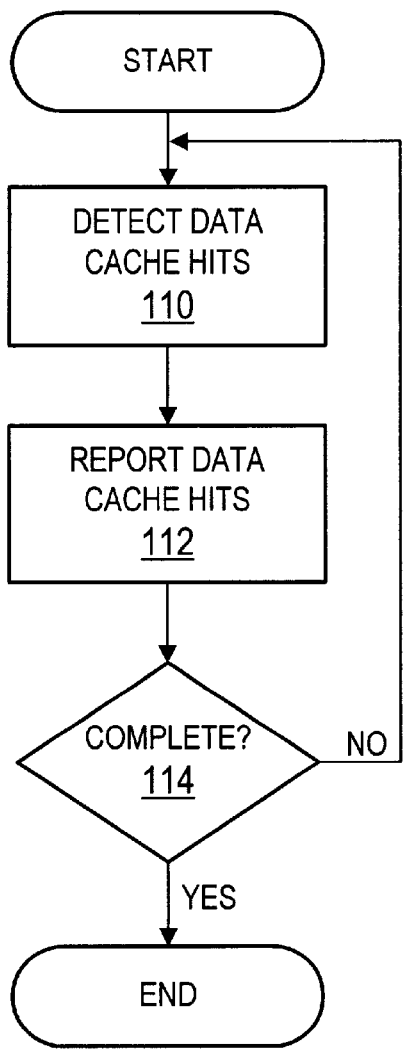
FIG. 7 is a flow chart of a process data cache hits step of the process data module of FIG. 6.

FIG. 7 is a flow chart showing the operation of process data cache hits step 92. Process data cache hits step 92 starts by detecting data cache hits at detect data cache hits step 110. A data cache hit is detected by reviewing the S I/D signal to determine when a cache hit occurs in combination with reviewing the S REQ signal to determine whether a cache hit is valid. After a valid cache hit is detected, this cache hit is reported at report data cache hit step 112.

During report data cache hit step 110, processor 40 searches for an available cycle to report a data cache hit. Because an instruction may have executed in the same cycle as the data cache hit, trace analysis system 44 finds an available cycle to report the data cache hit. If, in the process of finding an available cycle, another data cache hit occurs, then the first data cache access is dropped, and processor 40 continues searching for an available cycle to report this subsequently detected data cache hit. This process may repeat if another data cache hit is detected. Ultimately, system 44 reports the most recently detected data cache hit. After a cycle is found to report the most recently detected data cache hit, the selected test data is reviewed to determine whether the processing for cache hits is complete at step 114. When the processing of the selected test data for data cache hits is complete, then control transfers to process external data accesses step 96.

Figure 8:
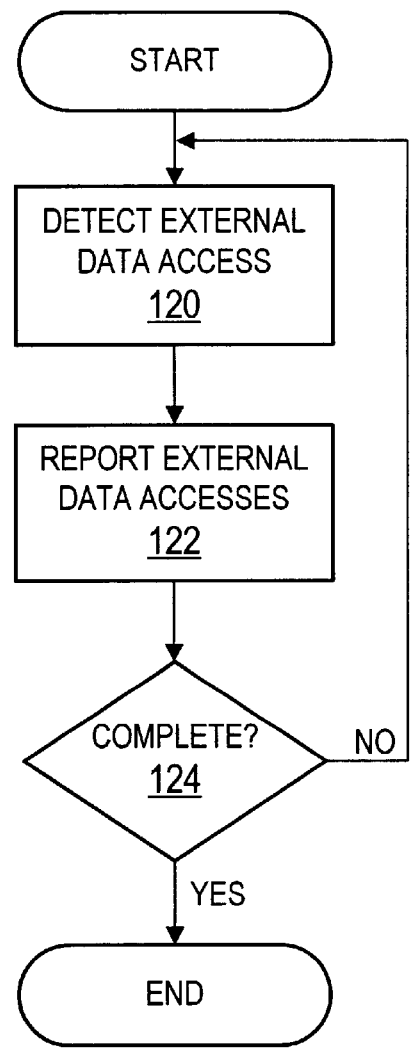
FIG. 8 is a flow chart of a process external data access step of the process data module of FIG. 6.

FIG. 8 is a flow chart showing the operation of process external data accesses step 96. Process external data accesses step 96 starts by detecting external data accesses at detect external data accesses step 120. An external data access is detected by determining when the RDY signal is low and the I/D# signal is low. After an external data access is detected, this external data access is reported at report external data access step 122.

During report external data access step 122, processor 40 searches for an available cycle to report the external data access. Because an instruction may have executed in the same cycle as the external data access, trace analysis system 44 finds an available cycle to report the data cache hit. If, in the process of finding an available cycle, another external data access occurs, then the first external access is dropped, and processor 40 continues searching for an available cycle to report this subsequently detected external data access. This process may repeat if another external data access is detected. Ultimately, system 44 reports the most recently detected external data access. After a cycle is found to report the most recently detected external data access, the selected test data is reviewed to determine whether the processing for external data accesses is complete at step 124. When the processing of the selected test data for external data accesses is complete, then control transfers to process data burst access step 98.

Figure 9:
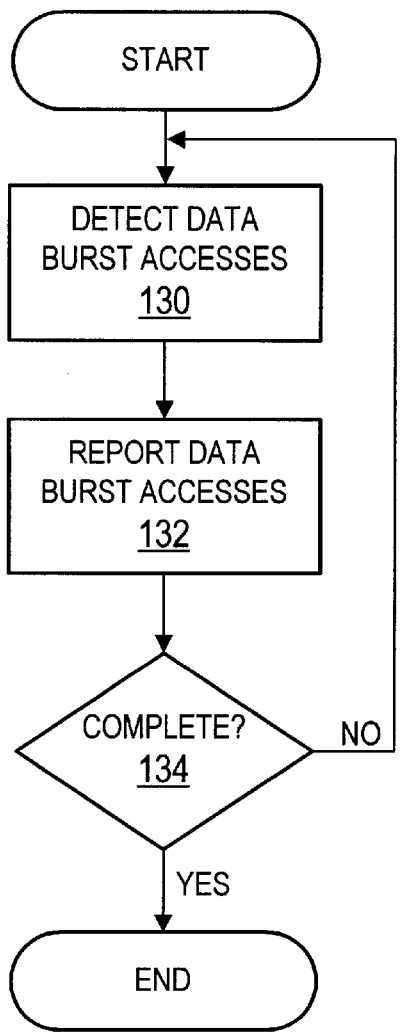
FIG. 9 is a flow chart of a process data burst access step of the process data module of FIG. 6.

FIG. 9 is a flow chart showing the operation of process data burst accesses step 98. Process data burst accesses step 98 starts by detecting data burst accesses at detect data burst accesses step 130. A data burst access is detected by detecting when the BURST signal is low. After a data burst access is detected, this data burst access is reported at report data burst access step 132.

During report data burst access step 132, processor 40 reports the data burst access in the same cycle as the data burst access occurred. There is not a possibility of an instruction executing during a cycle that a data burst operation occurs. When the processing of the selected test data for data burst accesses is complete, then control transfers to sample complete step 99.

Figure 10:
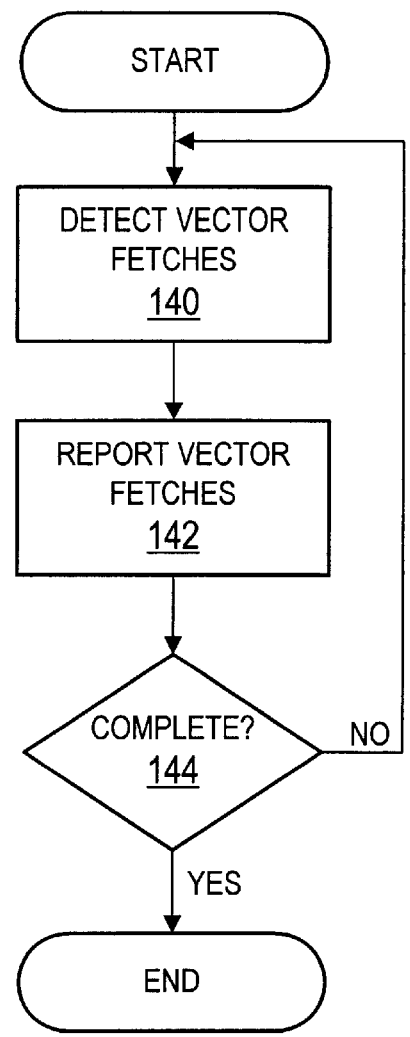
FIG. 10 is a flow chart of the process vector fetches step of the process data module of FIG. 6.

FIG. 10 is a flow chart showing the operation of process vector fetches step 100. Process vector fetches step 100 starts by detecting vector fetches at detect vector fetches step 140. A vector fetch is detected by reviewing the status signal STAT to determine when a vector fetch occurs as indicated by a value which indicates that main processor 26 is taking an interrupt or a trap. After a vector fetch is detected, this vector fetch is reported at report vector fetch step 142.

During report vector fetch step 142, processor 40 reports the vector fetch in the same cycle as the vector fetch occurred. There is not a possibility of an instruction executing occurring during a cycle that a vector fetch operation occurs. When the processing of the selected test data for vector fetches is complete, then process data module 70 is complete and control transfer to process instructions module 72.

Figure 11:
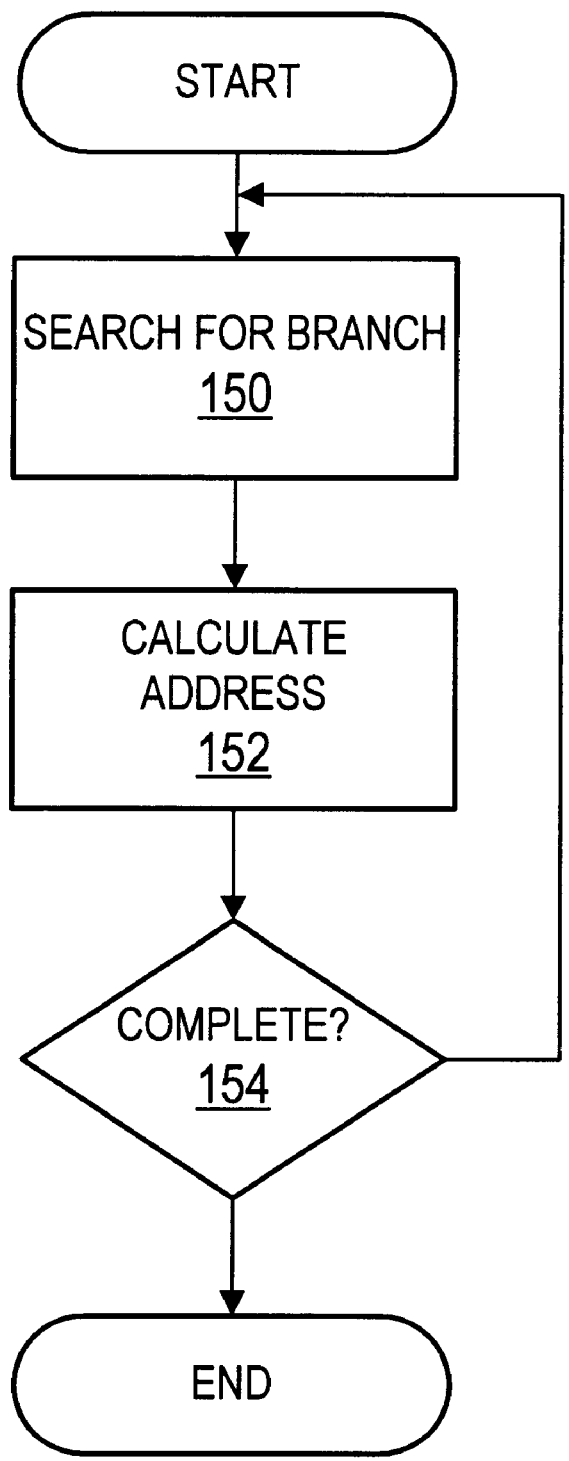
FIG. 11 shows a flow chart of the process instructions step of the flow chart of FIG. 6.

FIG. 11 is a flow chart showing the operation of process instruction module 72. As discussed above with reference to FIG. 5, processing of instructions begins by searching the selected test data for a branch instruction at search for branch step 150. When a branch instruction is found, control transfers to calculate address step 152, during which the address for the branch is calculated. Because branch instructions are always followed by a delay-slot instruction which always executes, the actual instruction sequence may be traced.

After calculate address step 152 completes, control transfers to step 154 during which the selected test data is reviewed to determine whether processing of the selected test data is complete. If so, then processing of the selected test data is complete. If not, then control returns to search for branch step 150 to search for the next branch in the instruction sequence of the selected test data. If no branch is found after all of the selected test data has been searched, then process instruction module 72 completes.

Figure 12:
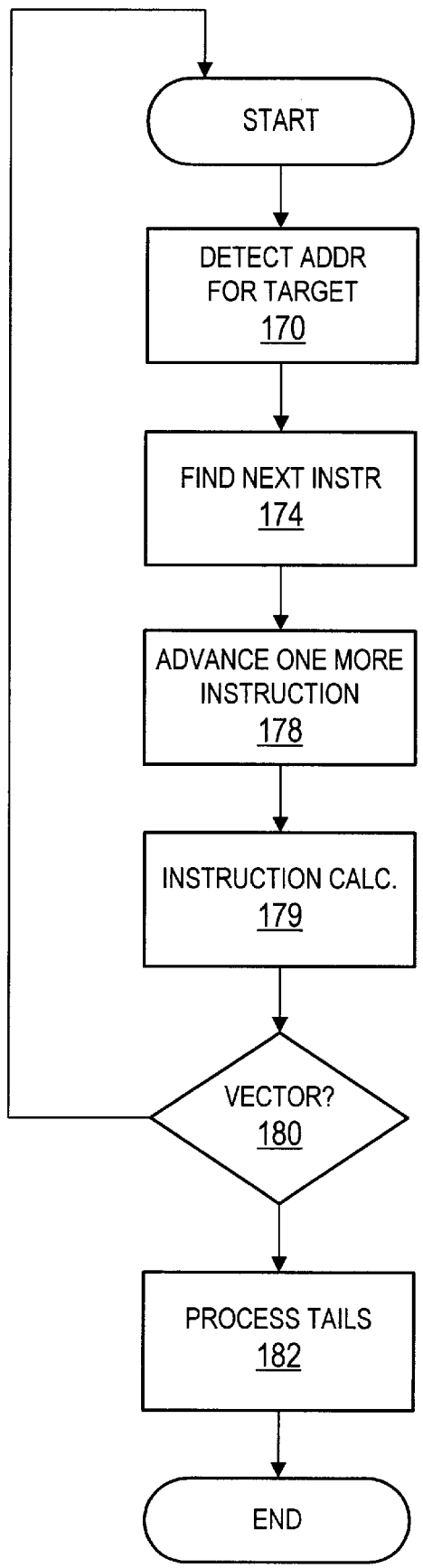
FIG. 12 shows a flow chart of the calculate address step of the flow chart of FIG. 11.

FIG. 12 shows the operation of calculate address step 152. Calculate address step 152 is passed the parameters STAT, ADDR, S ADDR, RDY and I/D# as well as the parameter b, which indicates that an instruction is a branch instruction. Calculate address step 152 starts by determining the address for the target of the branch instruction at step 170. This address is determined by reviewing the address data in the cycle which corresponds to when the branch instruction is issued. This data is provided from the information provided by main processor 26 and tracing processor 28.

After the branch target address is determined, the selected data instruction sequence is processed to find the next valid instruction at step 174. This is the delay slot instruction. Because the delay slot instruction always executes, execution of the branch target instruction is postponed until after the delay slot instruction executes. Find next instruction step 174 determines that a valid instruction is any instruction other than a pipeline hold instruction. If this next instruction is a vector instruction then calculate address step 152 recursively calls itself and control again transfers to determine address of branch target step 170. Assuming that the delay slot instruction is not a vector, control then transfers to advance one more instruction step 178.

Advance one more instruction step 178 advances the analysis of the selected data instruction sequence to the instruction targeted by the branch instruction. This instruction is the branch target instruction.

After the address of the branch target instruction is detected, then control transfers to instruction calculate step 181 which finds the instruction which corresponds to the branch target address. Instruction calculate step 181 also determines and processes the sequential instructions which follow the branch target instruction. After the sequential instructions which follow the branch target instruction are processed, then control transfers to vector determination step 180.

At vector determination step 180, the presently processed instruction, and more specifically, the status data which corresponds to this instruction, is reviewed to determine whether the instruction is a vector instruction. If the instruction is a vector instruction, then calculate address step 152 recursively calls itself and control again transfers to determine address of branch target step 170.

If the next instruction is not a vector, which indicates that the instruction sequence or nested group of instruction sequences, has been processed, control then passes to complete tails step 182.

Complete tails step 182 functions to return and detect delay slot instructions which were not earlier detected because vector instructions caused the instruction stream to branch away from the delay slot instruction. After processing of the tails is complete, address calculation step 152 completes, and control transfers to step 154.

While a vector exception is described herein, other events which lead to non-sequential instruction flow effect the operation of address calculation step 152. As with the vector exception, these other events which lead to a non-sequential instruction flow do not have the delay slot behavior of a branch instruction. For example, other types of non-sequential instructions such as an interrupt return may cause detection of a branch at step 150. Processing of an interrupt return varies because interrupt returns are not followed by delay slot instructions. Accordingly when processing an interrupt return, it is not necessary to advance the instruction sequence an extra step. Another exception may occur if back to back branches are detected, i.e., when the delay slot instruction is itself a branch instruction. In this case, address calculation step 152 again recursively calls itself.

Figure 13:
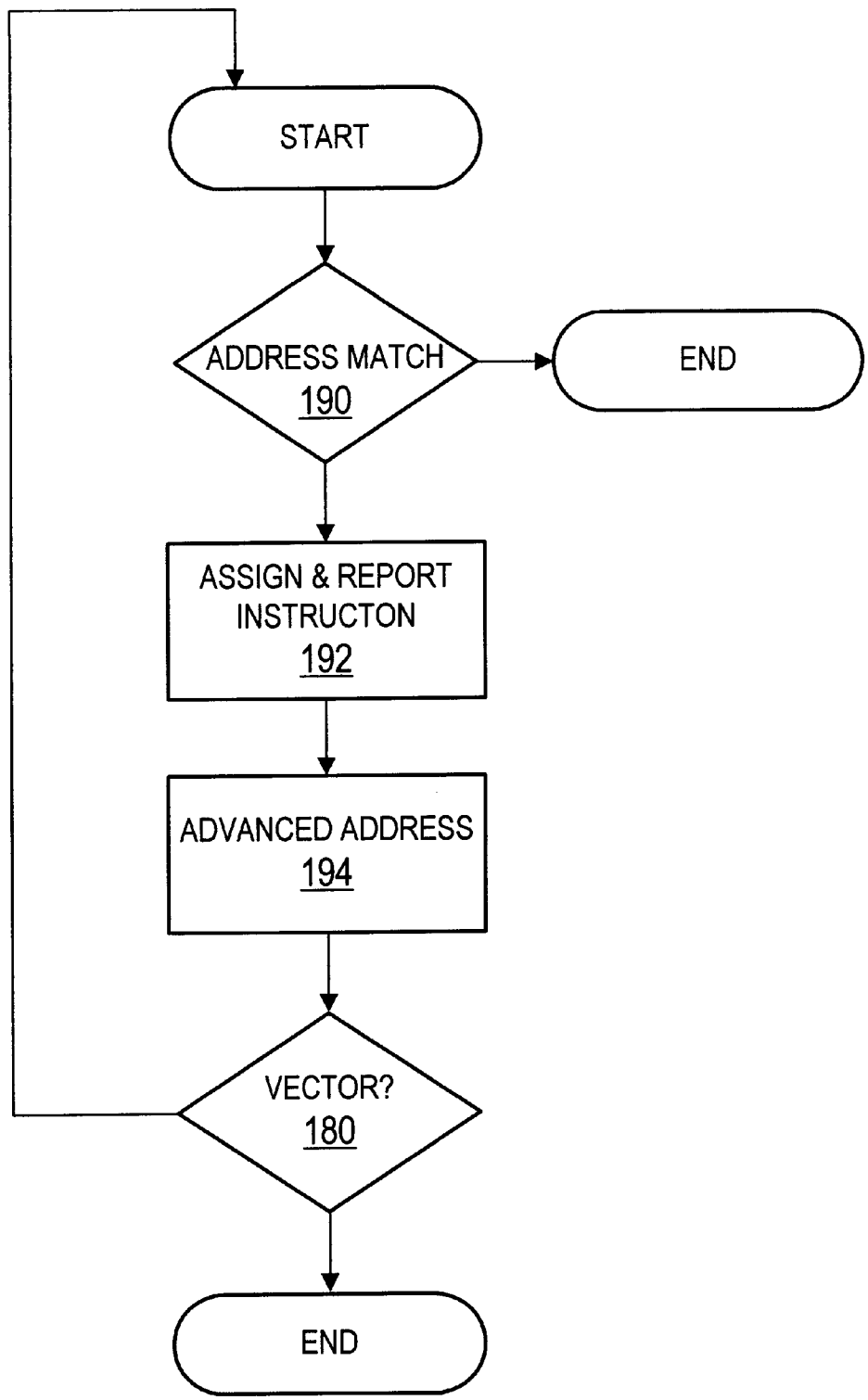
FIG. 13 shows a flow chart of the calculate instruction step of the flow chart of FIG. 12.

FIG. 13 shows the operation of instruction calculate step 181. Instruction calculate step 181 is passed the parameters STAT, ADDR, S ADDR, RDY and I/D# as well as the parameters depth, which indicates how long to process an instruction sequence to find the branch target instruction, and temporary address, which indicates the start address of possible addresses on the address bus which could contain the instruction. Calculate instruction step 152 starts by searching for a valid address match between the branch target address and an address in the address field. When an address match is found, then the instruction which corresponds to this address is the branch target instruction. Processing of the sequence then continues by advancing the value of the temporary address and then recursively calling itself. This sequence continues until a non-sequential instruction is detected, thus indicating the end of the present sequence of instructions.

OTHER EMBODIMENTS

Other embodiments are within the following claims.

For example, the trace analysis system 44 may be enhanced to enable multiple instruction execution or data accesses to be reported occurring on different processed trace lines which correspond to the same captured trace cycle. This eliminates the need to reposition or drop data accesses reporting. This enhancement allows trace analysis system 44 to operate with superscalar processors.

What is claimed is:

1. A method for tracing the operation of a processor using a tracing processor, to provide a trace output corresponding to cycles of operation of the processor, the method comprising:

capturing a trace of the operation of the processor using the tracing processor, providing the trace as selected test data, processing data accesses of the selected test data, and processing instructions of the selected test data based upon the detection of a non-sequential instruction having a target address, using the target address of the non-sequential instruction to determine an instruction flow.

2. The method of claim 1 further comprising examining the selected test data to determine whether there are any repeat accesses, and removing all but one of each repeat access.

3. The method of claim 1 wherein the processing data accesses step includes determining whether a data access is a data cache hit, and reporting the data cache hit in a next available cycle of the trace output.

4. The method of claim 1 wherein the processing data accesses step includes determining whether a data access is an external memory access, and reporting the external memory access in a next available cycle of the trace output.

5. The method of claim 1 wherein the processing data accesses step includes determining whether a data access is a data burst access, and reporting the data burst access in a cycle corresponding to the data burst access.

6. The method of claim 1 wherein the processing data accesses step includes determining whether a data access is a vector fetch, and reporting the vector fetch in a cycle corresponding to the vector fetch.

7. The method of claim 1 wherein the processing instructions step includes detecting the target address after the non-sequential instruction is detected.

8. The method of claim 7 wherein the processing instructions step includes processing the selected trace data to find a next valid instruction, and interpreting this instruction to be a delay slot instruction.

9. The method of claim 8 wherein the processing instructions step further includes advancing one more cycle in the selected trace data, and interpreting that an instruction corresponding to the one more cycle is an address of a branch target instruction.

10. The method of claim 9 wherein the processing instructions step further includes recursively calling the processing instructions step if the branch target instruction is a non-sequential instruction.

11. The method of claim 9 wherein the processing instructions step further includes calculating the branch target instruction based upon the address of the branch target instruction address.

12. The method of claim 11 wherein the processing instructions step further includes calculating a sequence of instructions following the branch target instruction.

13. (Amended) A method for producing an assembly code representation of operation of a processor using a tracing processor, the method comprising:

capturing a trace of the operation of the processor using the tracing processor, providing the trace as selected test data, and producing an assembly code representation of the selected test data based upon the selected test data, the producing assembly code step including processing data accesses of the selected test data, and processing instructions of the selected test data based upon the detection of a non-sequential instruction having a target address, using the target address of the non-sequential instruction to determine an instruction flow.

14. The method of claim 13 further comprising examining the selected test data to determine whether there are any repeat accesses, and removing all but one of each repeat access.

15. The method of claim 13 wherein the processing data accesses step includes determining whether a data access is a data cache hit, and reporting the data cache hit in a next available cycle of the trace output.

16. The method of claim 13 wherein the processing data accesses step includes determining whether a data access is an external memory access, and reporting the external memory access in a next available cycle of the trace output.

17. The method of claim 13 wherein the processing data accesses step includes determining whether a data access is a data burst access, and reporting the data burst access in a cycle corresponding to the data burst access.

18. The method of claim 13 wherein the processing data accesses step includes determining whether a data access is a vector fetch, and reporting the vector fetch in a cycle corresponding to the vector fetch.

19. The method of claim 13 wherein the processing instructions step includes detecting the target address after the non-sequential instruction is detected.

20. The method of claim 18 wherein the processing instructions step includes processing the selected trace data to find a next valid instruction, and interpreting this instruction to be a delay slot instruction.

21. The method of claim 20 wherein the processing instructions step further includes advancing one more cycle in the selected trace data, and interpreting that an instruction corresponding to the one more cycle is an address of a branch target instruction.

22. The method of claim 21 wherein the processing instructions step further includes recursively calling the processing instructions step if the branch target instruction is a non-sequential instruction.

23. The method of claim 22 wherein the processing instructions step further includes calculating the branch target instruction based upon the address of the branch target instruction address.

24. The method of claim 23 wherein the processing instructions step further includes calculating a sequence of instructions following the branch target instruction.

* * * * *